(12) United States Patent
Toya (10) Patent No.: US 11,584,315 B2
(45) Date of Patent: Feb. 21, 2023

(54) SENSOR SYSTEM FOR VEHICLE (71) Applicant: DENSO CORPORATION, Kariya (JP)

(72) Inventor: Takayuki Toya, Kariya (JP)

(73) Assignee: DENSO CORPORATION, Kariya (JP)

( * ) Notice: Subject to any disclaimer, the term of this patent is extended or adjusted under 35 U.S.C. 154(b) by 558 days.

(21) Appl. No.: 16/778,862

(22) Filed: Jan. 31, 2020

(65) Prior Publication Data
US 2021/0237669 A1 Aug. 5, 2021

(51) Int. Cl.
| | | |
|---|---|---|
| *B60R 16/023* | (2006.01) | |
| *G01S 17/931* | (2020.01) | |
| *G01S 19/25* | (2010.01) | |
| *G01S 13/931* | (2020.01) | |
| *B60R 11/04* | (2006.01) | |
| *G01S 13/86* | (2006.01) | |
| *B60R 11/00* | (2006.01) | |

(52) U.S. Cl.
CPC .......... *B60R 16/0238* (2013.01); *B60R 11/04* (2013.01); *G01S 13/86* (2013.01); *G01S 13/931* (2013.01); *G01S 17/931* (2020.01); *G01S 19/256* (2013.01); *B60R 2011/004* (2013.01); *B60R 2011/0064* (2013.01)

(58) Field of Classification Search
CPC ................. B60R 16/0238; B60R 11/04; B60R 2011/004; B60R 2011/0064; G01S 13/86; G01S 13/931; G01S 17/931; G01S 19/256; G01S 17/87; G01S 7/027; G01S 2013/9316; G01S 2013/9318; G01S 2013/93185; G01S 2013/9319; G01S 2013/932; G01S 13/865; G01S 13/867; G01S 2013/93273
See application file for complete search history.

(56) References Cited

U.S. PATENT DOCUMENTS

| | | | | |
|---|---|---|---|---|
| 6,526,352 B1* | 2/2003 | Breed | ..................... | G01S 19/41 701/470 |
| 6,720,920 B2* | 4/2004 | Breed | .................. | B60N 2/2863 342/357.31 |
| 6,759,979 B2* | 7/2004 | Vashisth | ................ | G01C 15/00 342/357.31 |
| 6,850,841 B1* | 2/2005 | Casino | ................... | G01C 21/26 701/461 |
| 6,968,272 B2* | 11/2005 | Knockeart | ....... | G08G 1/096883 701/414 |

(Continued)

*Primary Examiner* — Richard M Camby
(74) *Attorney, Agent, or Firm* — Posz Law Group, PLC (57) ABSTRACT

A sensor system for a vehicle includes a central module and a plurality of sub modules mounted in a frame of the vehicle, the sub modules being independently removable. The sub modules include sensors configured to capture image data and distance data in a vicinity of the vehicle. The central module is connected to each of the plurality of sub modules through a first network including a switching hub. The sub modules are individually connected to an external processor through a second network. The central processor is configured to synchronize the sub modules based on absolute time information through the first network, and the sub modules are configured to output the captured image data and distance data appended with synchronized time information to the external processor by communicating through the second network.

10 Claims, 8 Drawing Sheets

(56) References Cited

U.S. PATENT DOCUMENTS

| | | | | |
|---|---|---|---|---|
| 7,013,216 B2* | 3/2006 | Walters | ............ | G01C 21/20 |
| | | | | 701/428 |
| 7,072,764 B2* | 7/2006 | Donath | ............ | B60R 1/00 |
| | | | | 340/995.18 |
| 7,228,225 B1* | 6/2007 | Walters | ............ | G01C 21/26 |
| | | | | 701/465 |
| 7,493,086 B2* | 2/2009 | Landry | ............ | H04W 4/02 |
| | | | | 342/36 |
| 2005/0134440 A1* | 6/2005 | Breed | ............ | G01S 17/931 |
| | | | | 701/45 |
| 2006/0017807 A1* | 1/2006 | Lee | ............ | H04N 5/232945 |
| | | | | 348/E7.086 |
| 2008/0162036 A1* | 7/2008 | Breed | ............ | G08G 1/161 |
| | | | | 701/408 |
| 2008/0167819 A1* | 7/2008 | Breed | ............ | G08G 1/161 |
| | | | | 701/300 |
| 2017/0305360 A1 | 10/2017 | Zajac | | |

* cited by examiner

SENSOR SYSTEM FOR VEHICLE

TECHNICAL FIELD

The present disclosure relates to a sensor system for a vehicle.

BACKGROUND

In recent years, autonomous driving has emerged as an important area of technological research and development. Vehicles adapted for autonomous driving, especially higher level autonomous driving, are typically provided with an advanced sensor system for capturing various types of data, such as image data and distance data. These sensor systems may be installed during the manufacturing process of the vehicle, or may be installed as an after-market add on system. Such sensor systems are subject to improvement in design.

DETAILED DESCRIPTION

A plurality of embodiments of the present disclosure will be explained with reference to the figures.

Figure 1:
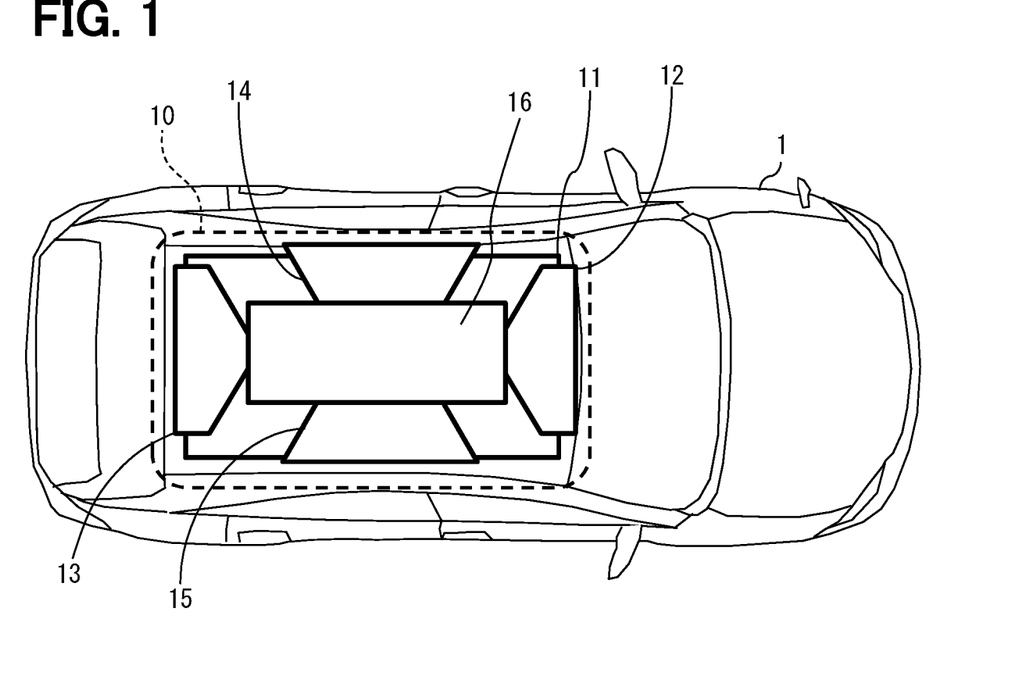
FIG. 1 is an overview of a sensor system mounted on a vehicle.

FIG. 1 shows a vehicle 1 provided with a sensor system 10 according to the present embodiment. While FIG. 1 shows a sedan type passenger vehicle, this example is not intended to be limiting. The present disclosure is equally applicable to all types of road vehicles, including trucks, busses, as well as specialized vehicles such as road sweepers.

The sensor system 10 includes a frame 11, a plurality of sub modules 12, 13, 14, 15, and a central module 16. In the present embodiment, the frame 11 is a metal structure adapted to be fixed to the roof of the vehicle 1. It should be noted that the frame 11 does not necessarily need to be a separate component from the vehicle 1. For example, in alternative embodiments, the frame 11 may be an integrated member of the roof of the vehicle 1, i.e., the frame 11 does not need to be provided as part of the sensor system 10.

As illustrated in FIG. 1, the central module 16 is adapted to be mounted in a central region of the frame 11 through corresponding fixtures (not illustrated) provided in the frame 11 and the central module 16. In the present embodiment, the central module 16 has a rectangular footprint when view from the above, but this exemplary design is not intended to be limiting. The physical footprint of the central module 16 may be adjusted as appropriate in accordance with required design specifications. In the present embodiment, the central module 16 is configure to be removable from the frame 11, but in alternative embodiments, the central module 16 may be permanently affixed to the frame 11.

The sub modules 12, 13, 14, 15 are adapted to be mounted in peripheral regions of the frame 11. Similar to the central module 16, the sub modules 12, 13, 14, 15 are mounted to the frame 11 through corresponding fixtures (not illustrated) provided in the frame 11 and each of the sub modules 12, 13, 14, 15. In the present embodiment, each of the sub modules 12, 13, 14, 15 is independently and removably mounted to the frame 11.

In FIG. 1, the sub modules 12, 13, 14, 15 include two front-rear modules 12, 13 mounted in the front and rear of the central module 16 with respect to the traveling direction of the vehicle 1, and two side modules 14, 15 mounted on either side of the central module 16 with respect to the traveling direction of the vehicle 1. In the present embodiment, the front-rear modules 12, 13 have the same structure as each other, and the side modules 14, 15 have the same structure as each other. Here, structure refers to both shape, i.e., physical footprint, and internal configurations such as sensor layouts. However, it should be noted that this example is not intended to be limiting. In alternate embodiments, the front-rear modules 12, 13, may simply have the same physical footprint as each other while having different internal configurations, or may be different in both physical footprint and internal configuration.

In the present embodiment, the sub modules 12, 13, 14, 15 are typically mounted so as to be close to the edge of the roof of the vehicle 1 to maximize visibility for internal sensors as will be described later, preferably without protruding over roof of the vehicle 1. To be adaptable to various types of vehicles, the sub modules 12, 13, 14, 15 have complementary shapes to allow for a close fit with each other when mounting specifications require as such.

Figure 2:
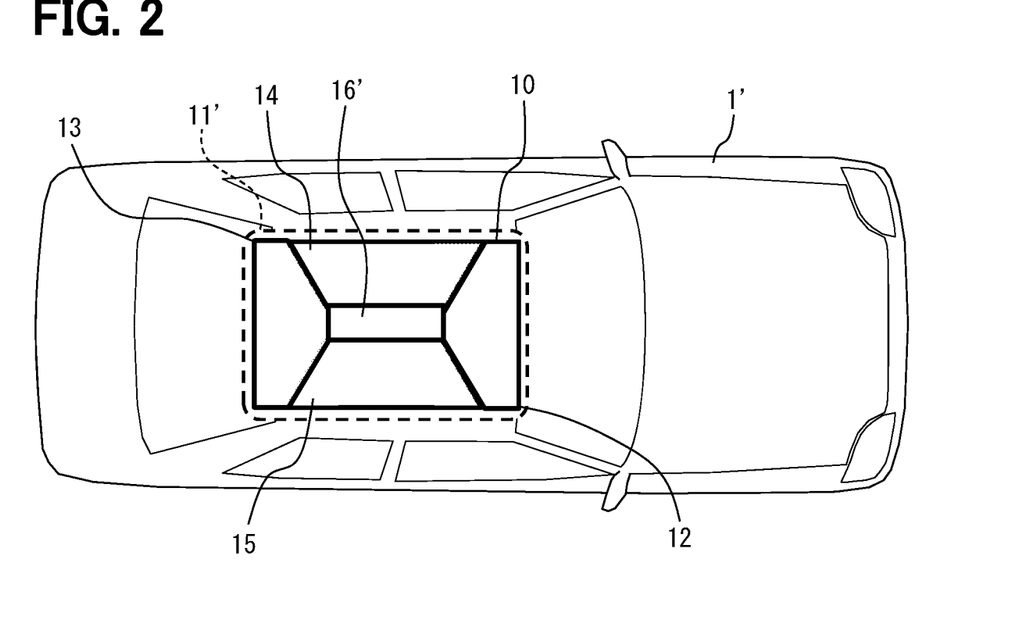
FIG. 2 is an overview of a sensor system mounted on another vehicle.

For example, the configuration in FIG. 1 shows a large gap between each of the sub modules 12, 13, 14, 15 due to the vehicle 1 having a relatively spacious roof. In contrast, FIG. 2 shows an alternative implementation in which a vehicle 1' has a smaller roof than the vehicle 1 of FIG. 1. As a result, the sub modules 12, 13, 14, 15 are arranged flush with each other. In this case, the sensor system 10 includes a frame 11' and a central module 16' with different physical footprints as those in FIG. 1 in order to accommodate the smaller roof of the vehicle 1'. Meanwhile, the sub modules 12, 13, 14, 15 may have the same physical footprints as those in FIG. 1.

Similar to the central module 16, it should be noted that the exemplary physical footprints of the sub modules 12, 13, 14, 15 shown in FIGS. 1 and 2 are not intended to be limiting. For example, to simplify manufacturing, the sub modules 12, 13, 14, 15 may have a square or rectangular footprint instead, or any other footprint in accordance with design specifications.

The sensor system 10 may include an outer housing (not illustrated) which encapsulates each of the central module 16 as well as the sub modules 12, 13, 14, 15 while allowing various sensors (described below) to still capture data. Such an outer housing provides increased structural integrity while also protecting the sensor system 10 from, e.g., adverse weather. Further, each of the central module 16 and the sub modules 12, 13, 14, 15 includes a respective housing (not illustrated) which provides appropriate sensor ports, wiring ports, fixtures, and other similar structural functions.

The specific design of these housings are not essential to the present disclosure, and so illustrations and descriptions thereof are omitted for brevity.

Figure 3:
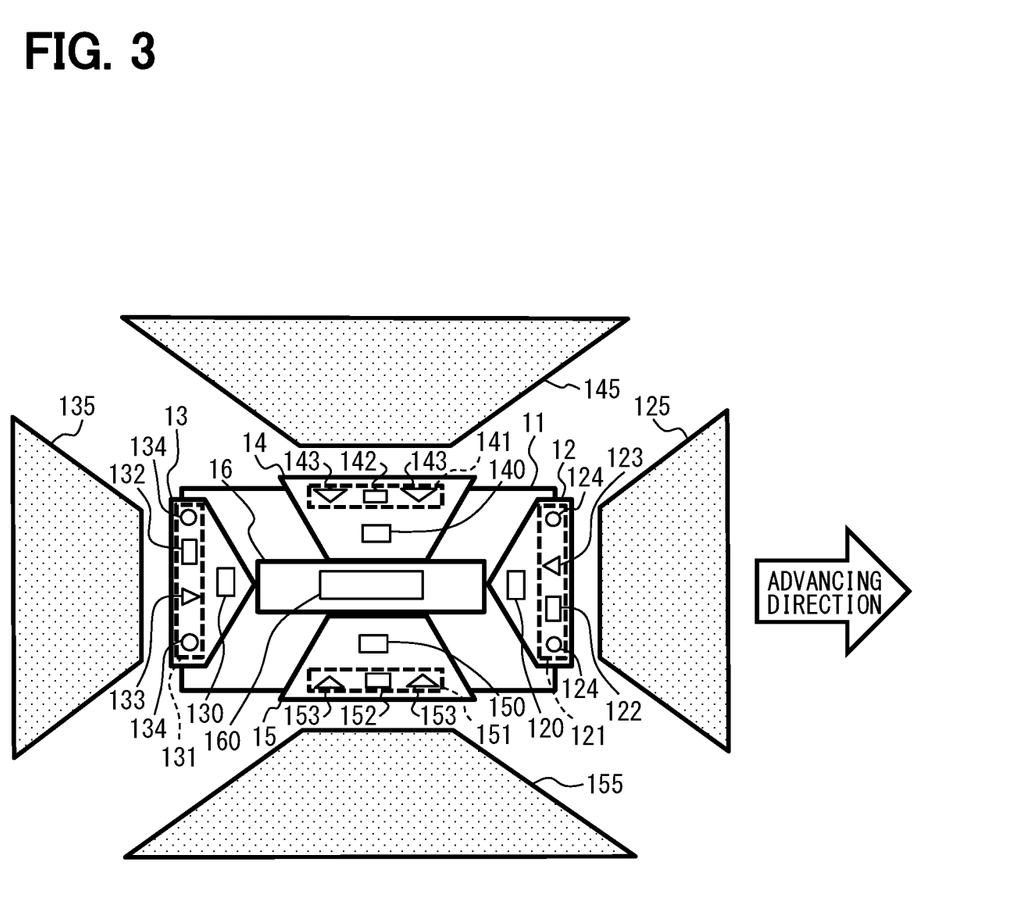
FIG. 3 is a schematic view of various modules in a sensor system.

FIG. 3 is a detailed view of the sensor system 10 of the present embodiment. First, the front-rear modules 12, 13 will be described. As mentioned above, in the present embodiment, the front-rear modules 12, 13 are identical to each other in terms of structure. Each front-rear module 12, 13 includes a sub processor 120, 130 and a sensor array 121, 131.

In the present embodiment, each sub processor 120, 130 is an electronic control unit that includes a central processing unit (CPU) and a memory including random access memory, read only memory, flash memory, or a combination of these. The memory has stored thereon instructions which, when executed by the CPU, cause the CPU to perform a variety of tasks as will be described later.

Each sensor array 121, 131 includes a LIDAR sensor 122, 132, a camera 123, 133, and a pair of millimeter wave radar sensors 124, 134. It should be noted that the specific sensor arrangement described herein is intended to be exemplary and non-limiting. Generally, as long as the sensor arrays 121, 131 have the capability of capturing image data and distance data, different combinations of sensors may be used. In the present embodiment, the cameras 123, 133 are used to capture image data, while the LIDAR sensors 122, 132 and the radar sensors 124, 134 are used to capture distance data. In modifications, for example, ultrasonic sensors may be additionally or alternatively used.

Next, the side modules 14, 15 will be described. As mentioned above, in the present embodiment, the side modules 14, 15 are identical to each other in terms of structure. Each side module 14, 15 includes a sub processor 140, 150 and a sensor array 141, 151.

In the present embodiment, each sub processor 140, 150 is an electronic control unit that includes a central processing unit (CPU) and a memory including random access memory, read only memory, flash memory, or a combination of these. The memory has stored thereon instructions which, when executed by the CPU, cause the CPU to perform a variety of tasks as will be described later.

Each sensor array 141, 151 includes a LIDAR sensor 142, 152 and a pair of wide-angle cameras 143, 153. Similar to the sensor arrays 121, 131 of the front-rear modules 12, 13, the specific sensor arrangement described herein is intended to be exemplary and non-limiting as long as the sensor arrays 141, 151 have the capability of capturing image data and distance data. In the present embodiment, the wide-angle cameras 143, 153 are used to capture image data, while the LIDAR sensors 142, 152 are used to capture distance data.

Autonomous driving systems typically demand different sensing requirements along the traveling direction of the vehicle as compared to the sides of the vehicle, because of both physical requirements (e.g., due to the vehicle having a greater length than width) and software requirements (e.g., due to heightened monitoring requirements in front of the vehicle). In this regard, as shown in FIG. 3, according to the present embodiment, front-rear sensing areas 125, 135 corresponding to the front-rear modules 12, 13 are narrower than side sensing areas 145, 155 corresponding to the side modules 14, 15.

The central module 16 includes a central processor 160 which, similar to the sub processor 120, 130, 140 150 of the sub modules 12, 13, 14, 15, is an electronic control unit that includes a CPU and a memory having program instructions stored thereon. The central processor 160 is in network communication with each of the sub processors 120, 130, 140, 150, details of which will be described later.

The above described structure and sensor layout of the sensor system 10 is exemplary and assumes a mid-level autonomous driving system (e.g., level 2 or level 3 under SAE classification). In practice, this class of autonomous driving systems often undergoes design changes both during development as well as after the initial sale (e.g., user-owned vehicles). For example, software updates are a common occurrence for vehicles with autonomous driving functions. More relevant to the present disclosure, changes to sensing capabilities may also be required when, for example, the operational design domain (ODD) of the overall autonomous driving system changes.

In this regard, the sensor system 10 of the present embodiment offers improved flexibility when changing the sensing capabilities of an autonomous driving system. Since each of the sub modules 12, 13, 14, 15 is independently mountable on the frame 11, any or all of the sub modules 12, 13, 14, 15 can be switched out with a sub module having a new design as long as their physical fixtures and connections are compatible with the frame 11 and the central module 16. In other words, a variety of sub module designs can be applied without requiring the frame 11 or the central module 16 itself to be modified. Significant changes in the ODD of the overall autonomous driving system can also be accommodated by the present sensor system 10. For example, low level driving assistance such as adaptive cruise control can be accommodated by providing only the front facing sub module 12 together with the frame 11 and the central module 16, while all sub modules 12, 13, 14, 15 may be installed to accommodate a higher level, fully autonomous driving system.

Moreover, the same sub modules 12, 13, 14, 15 can be applied to a plurality of types of vehicles by modifying the physical structure of the frame 11, and in some cases also modifying the physical structure of the central module 16 if overall size must be drastically reduced (e.g., FIG. 1 vs FIG. 2). In this regard, the sensor system 10 of the present embodiment allows fora standardized design of the sub modules 12, 13, 14, 15 with respect to a variety of vehicle types as long as the frame 11 is appropriately designed to be mountable to the roof of a particular vehicle (or appropriate integrally formed on the roof of a particular vehicle).

A specific implementation of the modular aspect of the sensor system 10 will be described with respect to FIGS. 4A, 4B, and 5.

Figure 4A:
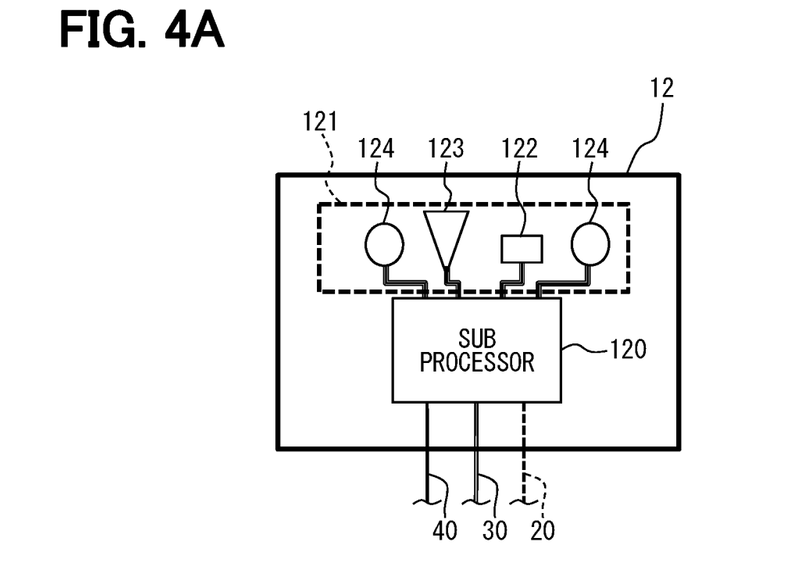
FIG. 4A is a schematic view of a sub module.

FIG. 4A is a schematic view of the front-facing sub module 12. As mentioned previously, in the present embodiment, the structures of the front-rear modules 12, 13 are identical, hence the descriptions herein are equally applicable to the rear-facing sub module 13. As illustrated, the various sensors 122, 123, 124 in the sensor array 121 are each connected to the sub processor 120 through a respective signal line. The physical level of these signal lines is not limited to a single wire, and may include a plurality of wires corresponding to data transfer, control signals, etc. and designed as appropriate.

The operations of the various sensors 122, 123, 124 in the sensor array 121 are controlled directly by the sub processor 120. The output signals from the sensor array 121 may include raw data and/or processed data. For example, the LIDAR sensor 122 may include on-board processing circuitry for generating a full 3-D distance map and output the 3-D distance map to the sub processor 120. Alternatively, the LIDAR sensor 122 may output raw distance data or intermediate data (for instance, histogram data representing distance per scan operation) to the sub processor 120. In this regard, the data input and output gateway for the entire sub module 12 is contained to the sub processor 120 itself. In other words, even if different types and/or number of sensors are disposed within the various sub modules 12, 13, 14, 15, the input/output specification of each sub module 12, 13, 14, 15 can be standardized with respect to each other.

The sub processor 120 is connected to various devices through a first network 20, a second network 30, and a third network 40. It should be noted that in the figures, single lines do not necessarily represent single wires in the physical layer, and may represent a plurality of physical wires, differential wires, etc. where appropriate. In the present embodiment, the first network 20 is a high speed local area network (e.g., Ethernet) contained within the sensor system 10. The first network 20 allows the sub processor 120 to communicate with the other modules 13, 14, 15, 16 and perform operations such as time synchronization, details of which will be described later.

The second network 30 is a high speed vehicle local area network for transmitting high volume data within the vehicle 1. In the present embodiment, the second network 30 includes a dedicate data communication line for outputting the image data and distance data captured by the sensor array 121 to an external processor, such as a high level ECU responsible for controlling the overall autonomous driving system. The image data and distance data is typically high volume data (especially with high resolution images) and therefore may require transmission over dedicated communication lines.

The third network 40 is a vehicle local area network that interconnects a variety of devices within the vehicle 1. In the present embodiment, the third network 40 is a CAN bus.

Figure 4B:
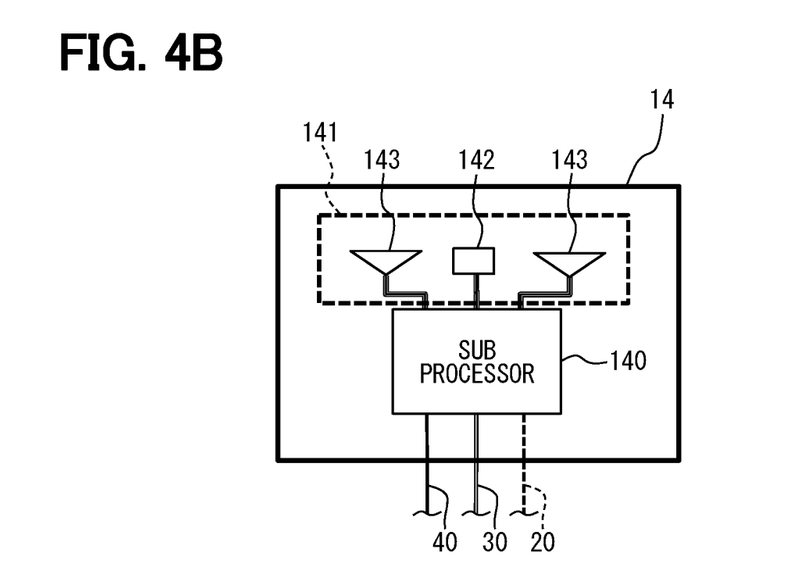
FIG. 4B is a schematic view of a sub module.

FIG. 4B is a schematic view of the sub module 14. As mentioned previously, in the present embodiment, the structures of the sub modules 14, 15 are identical, hence the descriptions herein are equally applicable to the sub module 15. Similar to above, the various sensors 142, 143 in the sensor array 141 are each connected to the sub processor 140 through a respective signal line, and the sub processor 140 is in turn connected to various external devices through the first network 20, the second network 30, and the third network 40. Specific details of these connections are similar to those of the sub module 12, and descriptions of such as omitted for brevity.

Figure 5:
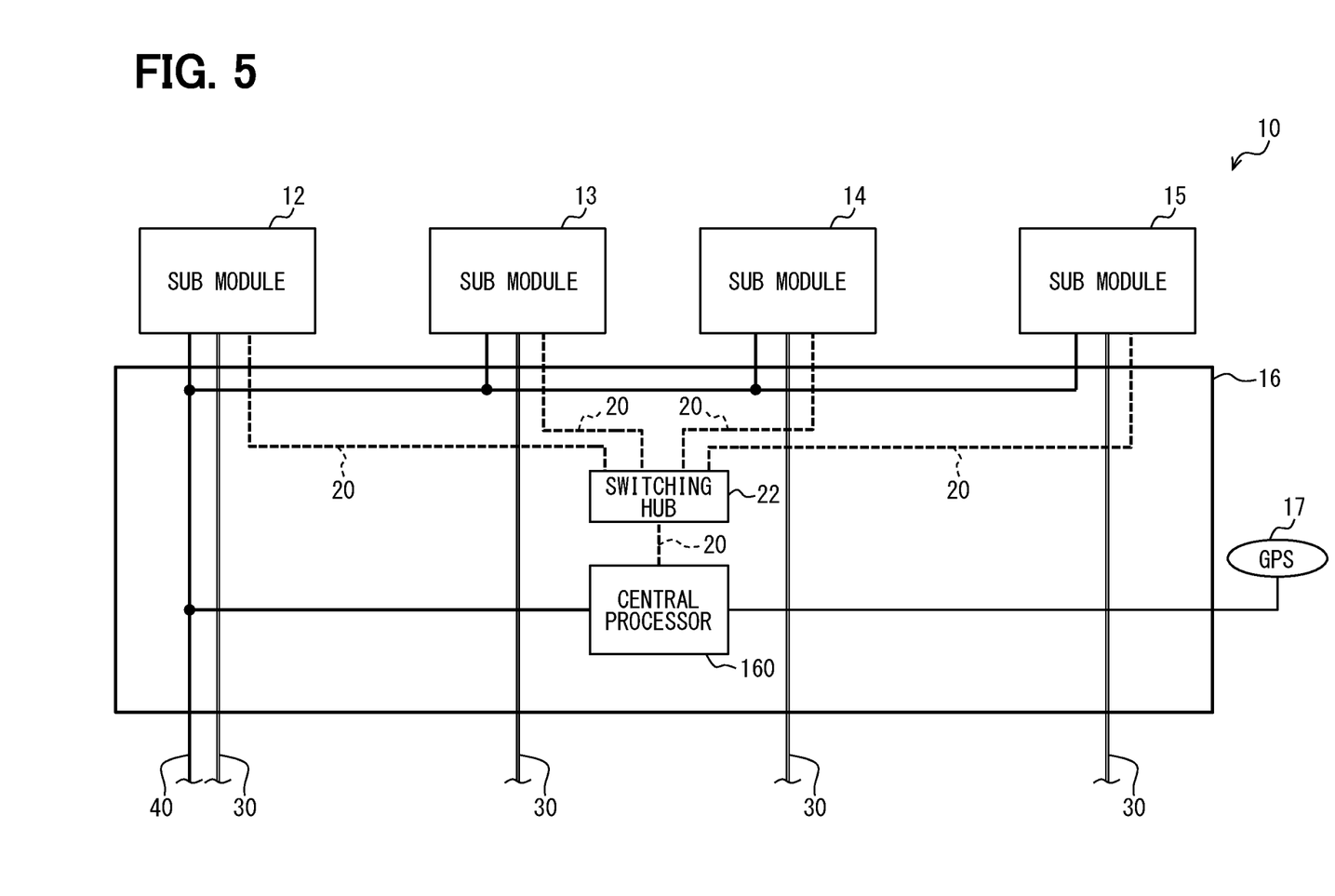
FIG. 5 is a schematic view of a sensor system connected to various networks.

FIG. 5 is a schematic view of the entire sensor system 10 showing the specific interconnectivity between the sub modules 12, 13, 14, 15 and the central module 16 with respect to the first, second, and third networks 20, 30, 40.

As mentioned previously, the first network 20 is contained within the sensor system 10. Signal lines from each of the sub modules 12, 13, 14, 15 and the central processor 160 are connected to a switching hub 22 provided in the central module 16. The switching hub 22 is a network switch which provides a full-duplex communication path between each of the sub modules 12, 13, 14, 15 and the central module 16.

The central processor 160 is programmed to periodically perform a synchronization process for synchronizing a master time to the sub modules 12, 13, 14, 15. In the present embodiment, the central processor 160 obtains the master time based on absolute time information from a satellite timing unit 17. The satellite timing unit 17 may be, for example, a GPS timing unit including a GPS antenna. The satellite timing unit 17 provides high precision absolute time information to the central processor 160. In the present embodiment, the satellite timing unit 17 is an external device to the sensor system 10, but this arrangement is not intended to be limiting. For example, in alternative embodiments, the satellite timing unit 17 may be an integral device within the sensor system 10, such as being disposed within the housing of the central module 16. The central processor 160 adjusts an internal clock (i.e., timer) based on the absolute time information received from the satellite timing unit 17 to produce the master time.

The first network 20 preferably implements a high precision clock synchronization protocol such as precision time protocol (PTP), network time protocol (NTP), or general network time protocol (gNTP). In this regard, the switching hub 22 may be optimized for a particular clock synchronization protocol by including specialized hardware circuitry such as a FPGA physical layer configured to handle PTP packets. In this case, the central module 16 may include a PTP capable network interface card to further improve time accuracy. Under such a clock synchronization protocol, the central processor 160 acts as the master device (i.e., server) and transmits the master time through the switching hub 22 to each of the sub modules 12, 13, 14, 15.

Figure 6:
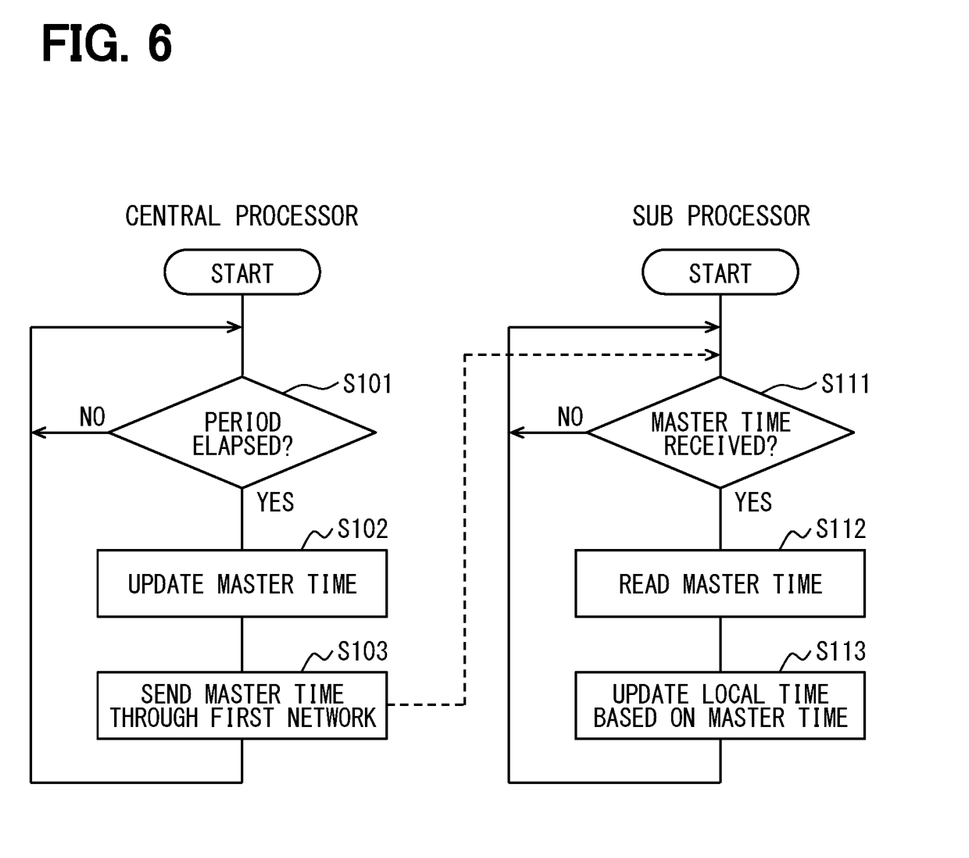
FIG. 6 is a flowchart showing processing steps of a synchronization process.

FIG. 6 is a flowchart illustrating a typical clock synchronization process between the central processor 160 and the sub processors 120, 130, 140, 150. At step S101, the central processor 160 determines whether a predetermined period has elapsed. If not, the central processor 160 remains at step S101 until the predetermined period elapses, thereby performing the synchronization process periodically.

When the central processor 160 determines at step S101 that the predetermined period has elapsed, the central processor 160 then updates the master time at step S102. Specifically, the central processor 160 obtains high precision absolute time information from the satellite timing unit 17, and updates an internal clock based on the absolute time information to produce the master time. Next, at step S103, the central processor 160 transmits the master time through the first network 20 to each sub processor 120, 130, 140, 150, and then returns to step S101 to wait until the next synchronization timing.

Meanwhile, the sub processor 120, 130, 140, 150 is programmed to wait at step S111 until the master time is received. Upon reception of the master time, the sub processor 120, 130, 140, 150 reads the master time at step S112 and then updates a local timer based on the master time at step S113. Here, the specific processing associated with each step generally depends on the clock synchronization protocol implemented in the first network 20. For example, if PTP is implemented in the first network 20, additional SYNC and REQ message in accordance with the PTP specifications are transmitted between the central module 16 and the sub modules 12, 13, 14, 15 to measure time parameters such as propagation time (i.e., delay) and appropriately account for any measured delays. This ensures that the local time in each of the sub modules 12, 13, 14, 15 is substantially identical to the master time of the central module 16.

Returning to FIG. 5, the second network 30 will be described next. As mentioned previously, the second network 30 is a high speed vehicle local area network for transmitting high volume data within the vehicle 1. As shown in FIG. 5, each communication line included in the second network 30 physically passes through the central module 16. In other words, although the second network 30 does not actually connect to the central processor 160, due to the modularized nature of the sensor system 10, the physical connections between each sub module 12, 13, 14, 15 and other devices within the vehicle 1 preferably pass through the central module 16.

The second network 30 includes a dedicated data communication line from each sub module 12, 13, 14, 15 to an external processor. As previously mentioned, this external processor may be a high level ECU responsible for controlling the overall autonomous driving system. In the present embodiment, this external processor receives the captured image data and distance data from each sub module 12, 13, 14, 15 to perform object recognition in the vicinity of the vehicle 1 in accordance with autonomous driving requirements.

Preferably, each sub module 12, 13, 14, 15 is configured to append time information to the captured image data and distance data. The time information is based on the synchronized time of the local timer in each sub modules 12, 13, 14, 15, and is preferably appended immediately upon receiving the image data and distance data from the respective sensor array 121, 131, 141, 151 and amended if necessary to ensure that the appended time reflects the data capture time as accurately as possible. For example, a predetermined offset time may be subtracted from the appended time to account for any delays between capturing the data and appending the time information. This predetermined offset time is determined in advance and stored as a static value in the memory of each sub module 12, 13, 14, 15.

Since the time synchronization process is periodically performed by the central module 16, the local time in each sub module 12, 13, 14, 15 is constantly updated. As a result, even though the sub modules 12, 13, 14, 15 append its local time to the captured image data and distance data, this time is generally accurate. The appended time information is used by external processors when processing the combined image data and distance data, e.g., to synchronize different frames of data with each other, or to synchronize the captured image data and distance data with external data from other vehicles, infrastructure (V2I), etc.

It should be noted that while FIGS. 4A and 4B depict the second network 30 as connecting to the sub processors 120, 140, this is only for convenience and ease of understanding. In alternative embodiments, the second network 30 may connect to any or all of the individual sensors 122, 123, 124, 142, 143 in addition to or instead of the sub processor 120, 140, for example if time information does not need to be appended to the captured data from a particular sensor.

Next, the third network 40 will be described. As previously mentioned, the third network is a vehicle local area network that interconnects a variety of devices in the vehicle 1. In the present embodiment, the third network 40 is an intra-vehicle CAN bus used to transmit and receive a large variety of general purpose control signals between the sub modules 12, 13, 14, 15, the central module 16, as well as other devices within the vehicle 1. Similar to the second network 30, the third network 40 also physically passes through the central module 16 with respect to the lines connecting to the sub module 12, 13, 14, 15.

In the present embodiment, the sub processor 120, 130, 140, 150 of each sub module 12, 13, 14, 15 has attribute information stored in a non-volatile area of its memory. This attribute information includes installation position (front, rear, left, or right), sensor configuration (e.g., specification and type of sensors), and other specification data. The sensor configuration information may be dynamically read by the sub processors 120, 130, 140, 150 directly from the sensors in the sensor arrays 121, 131, 141, 151, or may be stored in advance as predetermined data.

When the sensor system 10 is first powered up, an initialization process is performed in which each of the sub modules 12, 13, 14, 15 outputs its attribute information through the third network 40. This attribute information is received by the central module 16, other sub modules, as well as external devices. As a result, all devices in the third network 40 are able to construct an overall system configuration of the sensor system 10 and store this information in local memory. This initialization process may be performed during each power up of the sensor system 10 to allow the overall system configuration to be dynamically constructed.

While outside of the scope of FIG. 5, external devices such as an autonomous driving ECU may also use this overall system configuration information, which is output to the third network 40, to dynamically determine the sensing capabilities of the sensor system 10 and adjust various autonomous driving algorithms based on those sensing capabilities. In other words, the third network 40 allows the entire vehicle 1 to read and store the sensing capabilities and other attribute information of the sub modules 12, 13, 14, 15.

To accommodate the initialization process, each of the sensors in the sensor arrays 121, 131, 141, 151 of the sub modules 12, 13, 14, 15 may be connected directly to the third network 40 rather than being connected through their respective sub processors 120, 130, 140, 150. This allows each sensor to broadcast their sensing capabilities (view angle, resolution, rated distance, etc.) directly to the third network 40, i.e., to external devices within the vehicle 1.

The initialization process may also include an error checking process in which the central module 16 confirms whether a mismatch exists between the attribute information output from the sub modules 12, 13, 14, 15 and the actual configurations of the sub modules 12, 13, 14, 15. For example, the central module 16 may cross-reference the installation position information output from the sub modules 12, 13, 14, 15 with the actual installation positions of the sub modules 12, 13, 14, 15. The central module 16 may determine the actual installation positions via, e.g., port identification information sent through the switching hub 22, or via additional signal wires (not illustrated) that directly connect to each of the sub modules 12, 13, 14, 15. This error checking process allows the central module 16 to determine whether a sub module 12, 13, 14, 15 has been incorrectly installed, for example, whether a sub module configured to face the left side is mistakenly installed to the face the right side. The central module 16 may additionally update the attribute information stored in an incorrectly installed sub module with the correct installation position, therefore eliminating the need to re-mount the sub module.

As described above, each of the first network 20, the second network 30, and the third network 40 physically passes through the central module 16. As such, each of the sub modules 12, 13, 14, 15 can be connected to all of the networks through a single respective fixture provided in the central module 16. This configuration allows the connection fixtures of the sub modules 12, 13, 14, 15 and the central module 16 to be standardized, and as a result the sub modules 12, 13, 14, 15 may be switched out easily with any compatible model.

Figure 7:
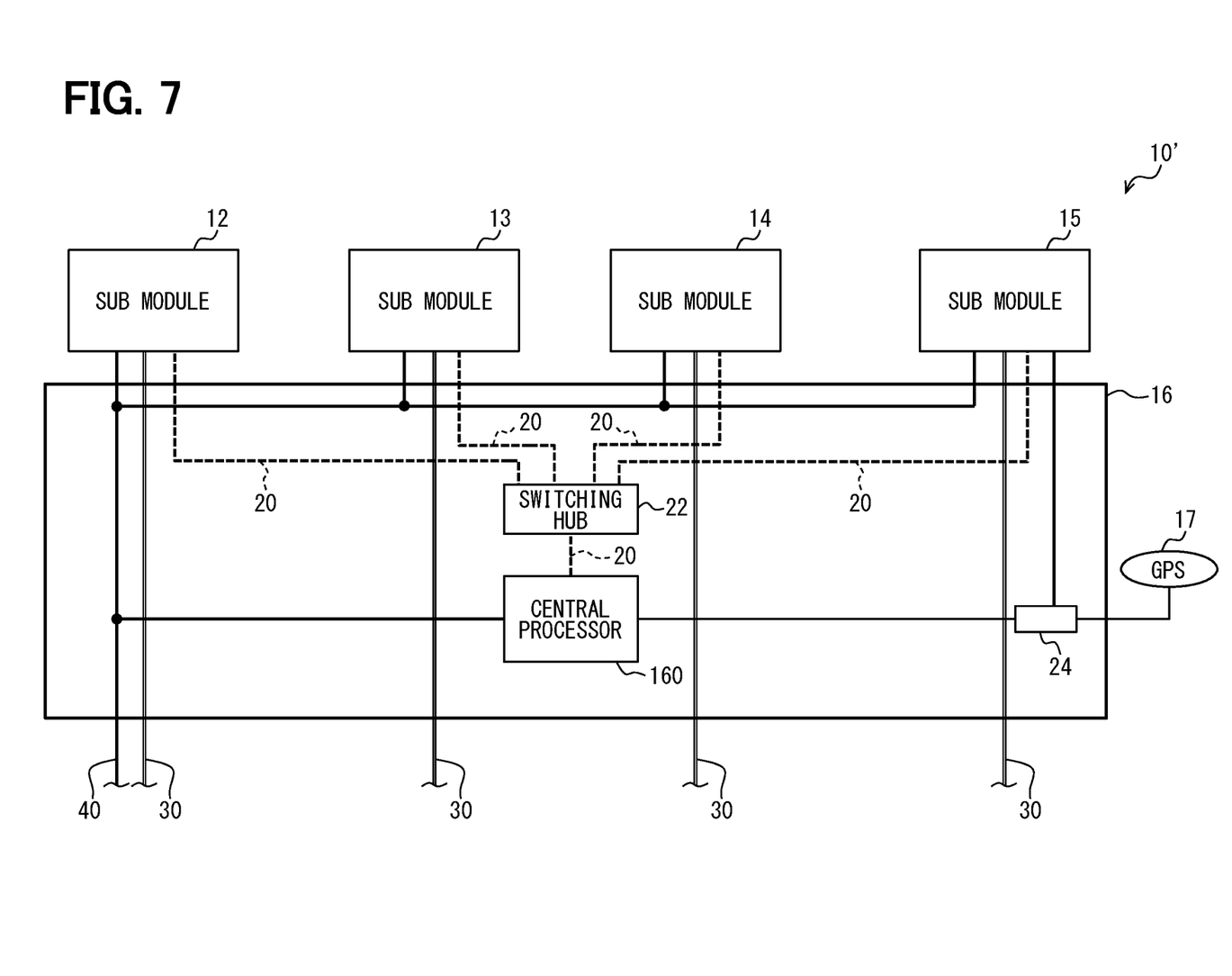
FIG. 7 is a schematic view of a sensor system connected to various networks.

It should be noted that due to the modular nature of the sensor system 10, there is a greater concern for various types of failure when compared to conventional, integrated designs. FIG. 7 shows a modified sensor system 10' with additional redundancy capabilities to account for the possibility of synchronization process failure. The modified sensor system 10' includes a signal distributor 24 disposed within the central module 16. The signal distributor 24 is configured to distribute the absolute time information signal from the satellite timing unit 17 to the central processor 160 and to at least one sub module 12, 13, 14, 15. In the illustrated example, the signal distributor 24 is connected to the sub module 15.

Figure 8:
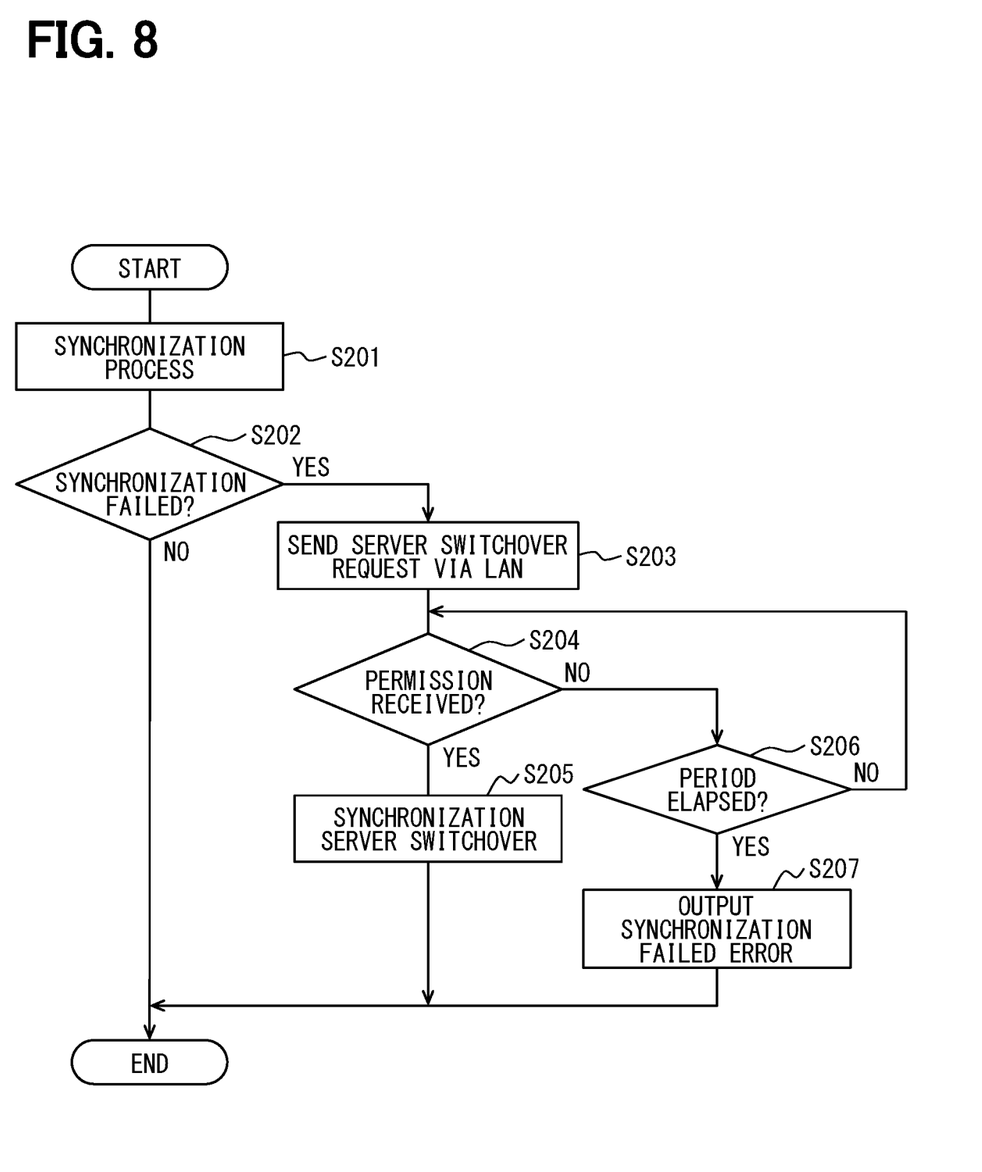
FIG. 8 is a flowchart showing processing steps of a synchronization failure handling process.

FIG. 8 is a flowchart illustrating a synchronization failure handling process performed by a particular sub module that directly receives the absolute time information from the satellite timing unit 17 (i.e., sub module 15 in the example of FIG. 7). In FIG. 8, step S201 generally refers to the synchronization process of FIG. 6. Upon completion of the synchronization process at step S201, the particular sub module determines whether that synchronization process has failed at step S202.

Here, failure of the synchronization process can be determined in a variety of manners. For example, the reception of a faulty clock signal from the central processor 160, such as a clock signal indicating an earlier time than a previously received clock signal, can be treated as synchronization failure. As another example, the periodic synchronization process not being performed within an expected timeframe can be treated as synchronization failure. As previously described, the central processor 160, which is the master clock server, is configured to periodically perform the synchronization process. If the central processor 160 stops this periodic synchronization while the vehicle 1 is in operation, synchronization failure has occurred.

Upon determining that the synchronization has failed at step S202, the particular sub module proceeds to step S203 and sends a server switchover request via the third network 40, i.e., the vehicle local area network common for the entire vehicle 1. The server switchover request is a data packet (or packets) requesting permission for the particular sub module to take over as the master clock server. In the present embodiment, the server switchover request is received by the central processor 160 which, upon receiving the request, outputs a response data packet to the third network 40. It should be noted that since the synchronization process is performed through the first network 20, a partial network failure in the first network 20 (e.g., between the central processor 160 and the switching hub 22) would not affect communication between the central processor 160 and the sub modules 12, 13, 14, 15 through the third network 40. As such, even if synchronization failure occurs in the first network 20, inter-module communication for the process of FIG. 9 can still be performed over the third network 40.

Meanwhile, after step S203, the particular sub module waits at step S204 for the response data packet from the central processor 160. If the response data packet has not been received yet, the particular sub module determines whether a predetermined waiting period has elapsed at step S206. While this waiting period has not elapsed, the particular sub module returns to waiting at step S204. Otherwise, when this waiting period elapses, the particular sub module abandons the server switchover request, and outputs a synchronization failed error at step S207. This error may be broadcast on the first network 20, the third network 40, or both the first and third networks 20, 40.

If the particular sub module receives the response data packet from the central processor 160 at step S204 indicating that permission for the server switchover is granted, the process continues to step S205 where the particular sub module performs a synchronization server switchover. The specific processing of the synchronization server switchover depends on the clock synchronization protocol implemented on the first network 20. For example, if PTP is implemented, the particular sub module may control the switching hub 22 to disable the previous master clock port (i.e., to the central processor 160), and designate the port corresponding to the particular sub module as the new master clock port. As a result, the particular sub module can perform the synchronization process of FIG. 6 in place of the central processor 160. Since the particular sub module directly receives the absolute time information from the satellite timing unit 17, the synchronization process can be performed at a high degree of precision even after the switchover.

Figure 9:
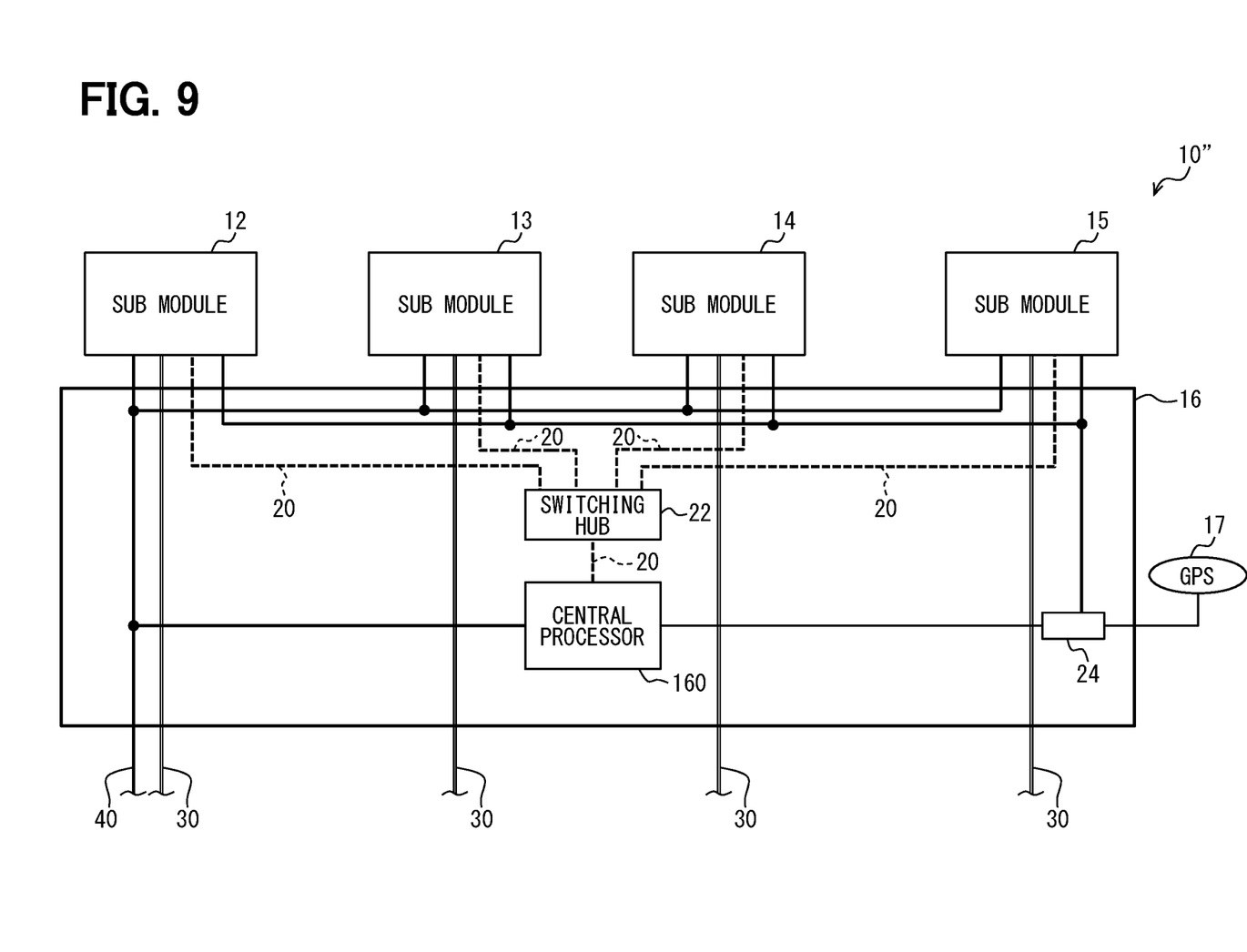
FIG. 9 is a schematic view of a sensor system connected to various networks.

FIG. 9 shows another modified sensor system 10" with further additional redundancy capabilities to account for the possibility of synchronization process failure. As illustrated, the signal distributor 24 of the modified sensor system 10" is connected all of the sub modules 12, 13, 14, 15. In other words, the absolute time information from the satellite timing unit 17 is transmitted to each of the sub modules 12, 13, 14, 15 in addition to the central processor 160. This configuration allows for a large amount of flexibility in how time synchronization is performed within the sensor system 10".

For example, the synchronization process of FIG. 6 may be the primary method of synchronization through a high precision protocol such as PTP, and the failure handling process of FIG. 8 could be performed by any one of the sub modules 12, 13, 14, 15 in case of failure. Alternatively, the failure handling process of FIG. 8 may be omitted in favor of each sub module 12, 13, 14, 15 directly obtaining the absolute time information from the satellite timing unit 17 in the event of synchronization failure. In this case, clock synchronization is entirely suspended, and each sub module 12, 13, 14, 15 simply appends the directly obtained time information to its captured image data and distance data. Further alternatively, each sub module 12, 13, 14, 15 may directly obtaining the absolute time information from the satellite timing unit 17 as the default method of timestamping the captured data, i.e., in favor over the synchronization process of FIG. 6.

The present disclosure is described with reference to the above embodiments, but these embodiments are not intended to be limiting. A variety of modifications which do not depart from the gist of the present disclosure are contemplated. While specific examples of network layouts are described above, these particular network layouts are not intended to be limiting for all embodiments of this disclosure. For example, although the above embodiments are described with respect to an exemplary network layout in which a high speed network with dedicated communication lines is used to transfer captured data, this may be modified such that the captured data is transferred over a different network instead if transfer capacity is sufficient (e.g., if an advanced generation high speed CAN network is able to accommodate the transfer of high volume capture data). Additionally, distinct networks may be combined if design specification allows for such modification in practice.

As another example, the synchronization protocol and any associated latency compensation processes are not necessarily limited to being implemented through the first network 20. Instead, a vehicle CAN bus such as the third network 40 can be used to perform the time synchronization process as a fallback or a replacement for the first network 20. In the case of a CAN bus, the time synchronization process may be performed by the server module (which may be the central module) sending the master time through the CAN bus, and each client module adding a fixed latency offset to the received master time. This latency offset value may be determined in advance through prior experimentation.

In this application, the terms "module" and "system" may include hardware components such as housings, fixtures, wiring, etc. In addition, in this application, the term "processor" may refer to, be part of, or include circuits or circuitry that may include processing core hardware (shared, dedicated, or group) that executes code and memory hardware (shared, dedicated, or group) that stores code executed by the processing core hardware. As such, the term "processor" may be replaced by the term "circuit".

The method steps, processes, and operations described herein are not to be construed as necessarily requiring their performance in the particular order discussed or illustrated, unless specifically identified as an order of performance. It is also to be understood that additional or alternative steps may be employed.

Although the terms "first", "second", "particular", etc. are be used to describe various elements, these terms may be only used to distinguish one element from another. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "front", "rear," "left", "right", and the like, may be used for ease of description to describe one element or feature's relationship to another element(s) or feature(s) as illustrated in the figures. Spatially relative terms may be intended to encompass different orientations of the device in use or operation in addition to the orientation depicted in the figures. For example, if the sensor system in the figures is rotated, elements described as "front/rear" would then be oriented "left/right" with respect to the vehicle. Thus, the example term "front" can encompass any direction in practice. The device may be otherwise oriented (rotated 90 degrees or at other orientations) and the spatially relative descriptors used herein interpreted accordingly.

The invention claimed is:

1. A sensor system for a vehicle having a roof-mounted frame, comprising:
    a central module configured to be mounted in a central region of the frame; and
    a plurality of sub modules independently and removably mountable in peripheral regions of the frame, wherein
    each sub module of the plurality of sub modules includes
        a plurality of sensors configured to capture image data and distance data in a vicinity of the vehicle, and
        a sub processor coupled to the plurality of sensors to receive the captured image data and distance data,
    the central module includes a central processor connected to the sub processor of each of the plurality of sub modules through a first network including a switching hub,
    the plurality of sub modules are connected to an external processor through a second network including a respective dedicated line from each sub processor to the external processor and passing through the central module,
    the central processor is programmed to:
        receive absolute time information from a satellite timing unit, and
        perform a synchronization process by communicating through the first network to synchronize the plurality of sub modules based on the absolute time information,
    the sub processor of each sub module is programmed to:
        append synchronized time information, which is obtained through the synchronization process, to the captured image data and distance data, and
        output the captured image data and distance data appended with the synchronized time information to the external processor by communicating through the second network.

2. The sensor system of claim 1, wherein
the plurality of sub modules include:
    at least one front-rear module adapted to be mounted on the frame on a front or rear side of the central module with respect to a traveling direction of the vehicle, and
    at least one side module adapted to be mounted on the frame on a lateral side of the central module with respect to the traveling direction of the vehicle, wherein
the at least one front-rear module has a different mounting footprint as the at least one side module.

3. The sensor system of claim 1, wherein
the plurality of sub modules include:
    first and second front-rear modules adapted to be mounted in the frame on a front side and rear side, respectively, of the central module with respect to a traveling direction of the vehicle, and
    first and second side modules adapted to be mounted in the frame on a left side and right side, respectively, of the central module with respect to the traveling direction of the vehicle, wherein
the first and second front-rear modules have a same mounting foot printing as each other, and
the first and second side modules have a same mounting foot printing as each other.

4. The sensor system of claim 1, wherein
the plurality of sensors include a camera sensor configured to capture the image data, and a radar sensor and a LIDAR sensor configured to capture the distance data.

5. The sensor system of claim 1, wherein
the central processor is programmed to perform the synchronization process by acting as a server in the first network and communicating the absolute time information to the plurality of sub modules over precision time protocol, network time protocol, or general precision time protocol.

6. The sensor system of claim 5, wherein
the satellite timing unit is further connected to at least a particular sub module among the plurality of sub modules, and
the sub processor of the particular sub module is programmed to, in response to a failure of the synchronization process by the central module:
    receive the absolute time information from the satellite timing unit, and
    perform a server switchover process to take over as the server in the first network to synchronize remaining ones of the plurality of sub modules based on the received absolute time information.

7. The sensor system of claim 6, wherein
the server switchover process includes communicating a server switchover request over a third network, the third network being a vehicle local area network connecting the sensor system to external devices in the vehicle.

8. The sensor system of claim 1, wherein
the central processor is programmed to periodically perform the synchronization process.

9. The sensor system of claim 1, wherein
the satellite timing unit is further connected to each of the plurality of sub modules, and
the sub processor of each of the plurality of sub modules is further programmed to, in response to a failure of the synchronization process by the central module:
directly receive the absolute time information received from the satellite timing unit to obtain the synchronized time information.

10. The sensor system of claim 1, wherein
the sub processor of each of the plurality of sub modules is further programmed to:
during the synchronization process, synchronize a local timer, and
immediately upon receiving the captured image data and distance data from the plurality of sensors, append the synchronized time information to the captured image data and distance data based on the local timer such that the synchronized time information reflects a data capture time of the captured image data and distance data.

\* \* \* \* \*